J. K. UNDERWOOD.
GAGES.
No. 190,933.            Patented May 15, 1877.
Witnesses.
Edwin Scott
R. E. White
Inventor:
John K. Underwood,
per R. F. Osgood,
Atty.

UNITED STATES PATENT OFFICE.

JOHN K. UNDERWOOD, OF GENEVA, NEW YORK, ASSIGNOR OF ONE-HALF HIS RIGHT TO W. J. MORSE, OF SAME PLACE.

IMPROVEMENT IN GAGES.

Specification forming part of Letters Patent No. 190,933, dated May 15, 1877; application filed November 28, 1876.

*To all whom it may concern:*

Be it known that I, JOHN K. UNDERWOOD, of Geneva, in the county of Ontario and State of New York, have invented a certain new and useful Improvement in Combined Rules and Gages, which I denominate the "Flexible Rule and Adjustable Ring-Gage;" and I do hereby declare that the following is a full, clear, and exact description of the construction and operation of the same, reference being had to the accompanying drawings, in which—

Figure 1 is a view showing the device extended as a rule. Fig. 2 is a view showing the device coiled as a ring-gage. Fig. 3 is a section through the clamp for holding the gage. Figs. 4 and 5 are modifications.

My improvement relates to a combined rule and gage, adapted especially to measuring lengths for forming finger-rings, and for gaging the sizes of the rings, although it is adapted to other purposes.

The invention consists of a strip of spring metal, constructed, arranged, and operating as hereinafter more fully described and definitely claimed.

A represents the strip of spring metal. It may be of steel, brass, or any other suitable material. Its inherent elasticity is such as will cause it to open or extend itself when not restrained. In this condition it is used as a rule, as shown in Fig. 1, being laid alongside of, or upon, the length of gold from which the piece is to be cut to form the finger-ring. One end of this strip is cut with an index or scale, $a$, which may be upon the inside, the outside, or the edge of the metal. The divisions of this scale correspond with the different sizes of finger-rings above the first size, which are usually twelve in number, the smallest being for a child's finger, the largest for the largest finger of an adult. The blank end $b$ (which is uncut with the index) is of a length to correspond with the smallest finger-ring, so that in laying out the smallest ring the measure is simply from the blank end to the first division of the scale. From this division upward the lengths can be laid out by adding one or more numbers of the scale, according to the desired size of the ring.

In Fig. 2 the device is shown as a ring-gage. In this case the strip A is coiled around in a circle, the ends overlapping, and the whole secured by a clamp. For this purpose the scale end of the strip is cut with a longitudinal slot, having an offset or enlargement, $c\ c'$, at the outer end. The opposite end of the strip is provided with a fixed screw, $d$, which, when the strip is coiled, enters the enlargement $c'$, and slides along in the slot $c$. The screw is slotted to form a shoulder near its bottom, which holds over the edges of the slot $c$, when once entered through the enlargement $c'$, and prevents the overlapping ends from springing apart. The bottom of the screw is square, or of other suitable shape, in cross-section, resting in a corresponding socket or hole of the strip, and it is riveted down, by which it is held in place and kept from turning. $f$ is a washer, which rests around the screw, and $g$ is a nut, of any suitable form and material, which rests upon the upper end of the screw, and bears upon the washer. By turning the nut down the overlapping ends of the ring-gage can be secured together at any adjustment. The washer is preferably convex or dishing, and the bottom of the nut correspondingly concave or hollowing, so that when the nut bears down upon the washer the tendency is to crowd the washer toward the center; but they may be made of different form, if desired.

The ring-gage above described is placed around the finger, and wound up to gage the size of the finger, and is then clamped by the nut. The blank extremity of the strip, sliding over the scale $a$, serves as a pointer to indicate the exact size of the circle. This circle will be the same length as the piece to be cut from the strip of gold to form the ring, and when the gage is extended as a rule, the piece can readily be laid out and cut, as before described. The gage is also of service in adapting different sizes of rings to a given size, as it indicates how much should be taken out of a large ring, or inserted in a small ring, to produce a desired size. It is frequently the case that a purchaser fancies a certain ring, and it must be enlarged or contracted to fit the finger. This gage indicates the proper size, and the ring, in finishing, is fitted on a conical forming stick or mandrel having the sizes to correspond with those of the gage.

I am aware that rules and gages are in use for various purposes.

My invention consists, essentially, of the strip of metal A, serving both purposes by reason of its elasticity, having a scale or index arranged at one end, so that while one size to be measured can be laid out by the blank space, the several larger sizes can be laid out by the divisions of the scale, the blank end of the coil also answering as the pointer on the scale when used as a ring-gage.

It is essential, in this invention, that the strip A should be made of spring metal rather than as a flexible one, since, in its use for measuring fingers, it has to be drawn up into a very small circle, and when so drawn up it is desirable to preserve its round shape, which it would not do if simply of thin flexible metal This elasticity is also desirable to enable it to extend itself, and preserve its straight length when used as a rule, as shown in Fig. 1. Furthermore, the slotted form for producing the adjustment is essential in contradistinction to simple perforations, since very small adjustments must be made, which the slot allows, whereas perforations are at given intervals apart, and small adjustments cannot be produced. The use of the screw, the washer, and the nut in connection with the slot insures easy and accurate adjustment, and allows the two overlapping ends of the strip to fit closely together, and be inserted on or removed from the finger, which could not well be done if a cumbersome fastening device were employed.

Having thus described my invention, I do not claim a flexible metallic strap marked with a scale and provided with a clasp; but

I claim—

The combined rule and ring-gage, consisting of the strip A, made of spring metal, so as to preserve its circle when coiled and extend itself when released, and provided at one end with a longitudinal slot, $c$, with an enlargement, $c'$, and at the other with a screw, $d$, so arranged that when the strip is coiled the screw passes through the slot, and is secured by the nut $g$ and washer $f$, the whole combined to operate as and for the purpose specified.

In witness whereof I have hereunto signed my name in the presence of two subscribing witnesses.

JOHN K. UNDERWOOD.

Witnesses:
R. F. OSGOOD,
EDWIN SCOTT.